United States Patent [19]

DiDomenico, Jr.

[11] 4,456,737

[45] Jun. 26, 1984

[54] HIGH SOLIDS COATING COMPOSITION BASED ON BISHYDROXYMETHYL TRICYCLO POLYOLS

[75] Inventor: Edward DiDomenico, Jr., Anoka, Minn.

[73] Assignee: Henkel Corporation, Minneapolis, Minn.

[21] Appl. No.: 484,246

[22] Filed: Apr. 12, 1983

[51] Int. Cl.³ .................... C08L 61/28; C08G 12/32
[52] U.S. Cl. .................... 525/398; 525/515; 528/230; 528/248; 528/252; 528/254; 528/259; 528/262; 528/265; 528/266
[58] Field of Search ............. 525/515, 398; 528/254, 528/259, 266, 230, 262, 265; 568/445

[56] References Cited

U.S. PATENT DOCUMENTS

| 3,960,983 | 6/1976 | Blank ............................ 525/496 |
| 4,119,762 | 10/1978 | Anderson et al. ............. 525/515 |
| 4,246,376 | 1/1981 | DiDomenico, Jr. ........... 525/398 |
| 4,319,049 | 3/1982 | Rogier .......................... 528/75 |

*Primary Examiner*—Theodore E. Pertilla
*Attorney, Agent, or Firm*—Bacon & Thomas

[57] ABSTRACT

A composition of matter useful as a high solids coating is disclosed. The composition comprises at least one bishydroxymethyl tricyclo compound and at least one amino crosslinking agent.

7 Claims, No Drawings

HIGH SOLIDS COATING COMPOSITION BASED ON BISHYDROXYMETHYL TRICYCLO POLYOLS

BACKGROUND OF THE INVENTION

1. Technical Field of the Invention

The present invention is directed to compositions of matter useful as high solids coatings and containing methylolamino curing agents.

2. Description of the Prior Art

High molecular weight acrylic and polyester resins have dominated the coatings industry, primarily as a result of the combination of properties, i.e., film hardness, flexibility, chemical resistance, water resistance, and gloss retention, required by the industry. However, with the advent of solvent emission regulations, the industry has turned to high solids coatings. Initial work on high solids coatings was directed to lowering the molecular weight of the acrylic and polyester resins. Because polyester resins could be made at much lower molecular weights than acrylic resins, most of the interest centered on making very low molecular weight polyester polyols which could be cured with melamines and other methylolamino curing agents.

Conventional high solids polyesters are made from short chained aliphatic diol and triols such as 1,4-butandiol, 1,6-hexandiol, trimethanol propane, or glycol ether polyols. These are reacted with difunctional acids or esters such as adipic acid, maleic anhydride, and phthalic anhydride. In order to get the proper combination of hardness and flexibility in low molecular weight polyesters it is important that a combination of hard and soft polyalcohols and polyacids be used. The hard components are usually the polyfunctional acids or esters such as phthalic anhydride. These are usually aromatic or unsaturated aliphatic acids which impart rigidity to the polyester resin, which translates into film hardness. The soft component is usually the polyol, e.g., 1,4-butandiol, 1,9-nonanediol, or glycol ether polyols. One exception is trimethanol propane which promotes film hardness by increasing crosslink density. If diols such as 1,6-hexandiol or 1,4-butandiol are used then unesterified or partially esterified very low molecular weight products in the polyester resin are volatilized when the polyester resin is cured with melamines. If glycol ether polyols are used such as ethylene or propylene glycol, then the ether functionality causes water sensitivity and poor gloss and color retention. Thus, while high solids polyesters have achieved some success in reducing solvent emissions in coatings, their performance properties are generally inferior to high molecular weight acrylic and polyester resins.

As used herein, the term methylolamino denotes a compound which is the product of an amino compound and an aldehyde (usually formaldehyde, giving rise to the methyl term) and the etherified and partially etherified derivatives thereof. Thus, the term encompasses polyfunctional amino compounds of the formula:

(R'HN)$_n$—R—NHR"

where n is 1 or greater, R' and R" are hydrogen or other groups including cycle forming carbons and R is a carbon containing backbone.

Methylolamino curing agents including those derived from melamines, guanamines, urea formaldehydes and glycoluril, are well known in the art. See, e.g., U.S. Pat. No. 4,246,376 to DiDomenico and the references cited therein, the disclosures of which are hereby incorporated by reference.

SUMMARY OF THE INVENTION

The present invention provides a composition of matter which is the product of at least one methylolamino compound and at least one bishydroxymethyl tricyclo polyol which is a member selected from the group consisting of compounds of the formulae:

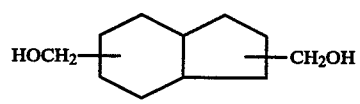

(I)

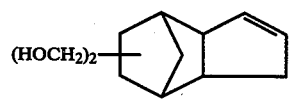

(II)

and certain derivatives of these polyols described hereinafter. The composition exhibits excellent properties as a high solids coating.

DETAILED DESCRIPTION OF THE PREFERRED EMBODIMENTS

The bishydroxymethyl tricyclo polyols used in the invention are derived from dicyclopentadiene having the structural formula:

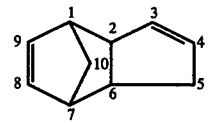

Bishydroxymethyl tricyclodecane derivatives are prepared by hydrogenating the dialdehyde that has been obtained via an oxo-reaction of dicyclopentadiene as follows:

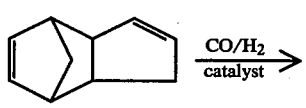

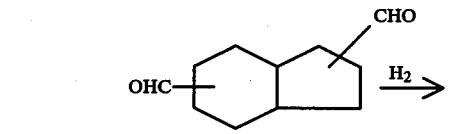

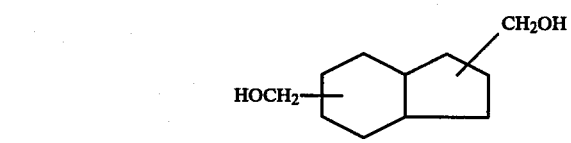

Cobalt carbonyl and rhodium oxide are typically used to catalyze the oxo-reaction. The hydroxymethyl groups are attached at the 8 or 9 and 3 or 4 positions on the ring structure corresponding to the points of unsaturation of the dicyclopentadiene starting material.

It is also possible to prepare geminal bishydroxymethyl polyols by employing selective reactive conditions described in detail in U.S. Pat. No. 4,319,049 to Rogier, the disclosure of which is hereby incorporated by reference. As described by Rogier, the reaction sequence to obtain the geminal bishydroxymethyl derivative proceeds as follows:

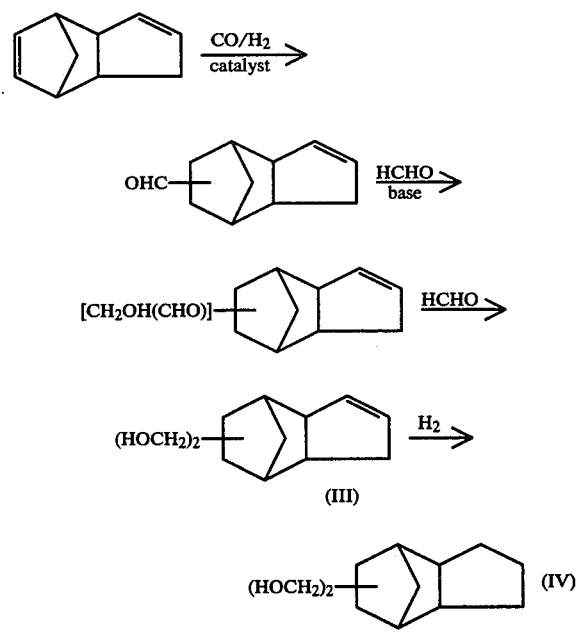

In this reaction, hydroformylation is restricted to the 8 and 9 positions of the dicyclopentadiene ring, thereby producing the geminal bishydroxymethyl tricyclodecanes of formula (IV). These compounds are identified as 8,8(9,9-bishydroxymethyl)-tricyclo[5,2,1,0$^{2,6}$]decane.

To obtain the unsaturated geminal bishydroxymethyl tricyclodecene of formula (III), the final hydrogenation step is omitted. This compound is identified as 8,8(9,9)bis(hydroxymethyl)tricyclo[5,2,1,0$^{2,6}$]dec-3-ene.

In the present invention both geminal and non-geminal forms of the bishydroxymethyl tricyclo polyols are acceptable. Accordingly, as used herein, the structural formula:

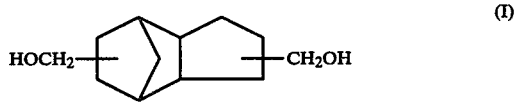

is intended to encompass both the geminal and non-geminal forms of bishydroxymethyl tricyclodecane, while the formula:

denotes the geminal bishydroxymethyl tricyclodecene.

It is further possible to react the bishydroxymethyl tricyclo polyols with alkylene oxides such as ethylene oxide, propylene oxide and styrene oxide, caprolactone and polycarboxylic acids such as adipic acid, phthalic acid and the corresponding anhydrides, to modify water solubility and viscosity and to provide greater flexibility in the coating.

The other component utilized in forming the compositions of the present invention is the methylolamino compound. These materials are generally sold as ethers of the reaction product of formaldehyde and an amino material such as melamine, urea, thiourea, guanamines, substituted thioameline, triaminopyrimidine, 2-mercapto-4,6-diaminopyrimidine, 3,5-diaminotriazole, carbamylguanazole, 2,4-diaminothiodiazole, glycoluril, and 2-oxo-4,5-diaminoparabanic acid.

Basically, the most practical components for use herein are the melamine, urea, glycoluril and guanamine materials. Stated simply, the preparation of such materials is old in the art and it is sufficient to say that formaldehyde is reacted with the amino hydrogens in varying amounts depending upon the type of resin which is desired. Thus with melamine which contains three primary amine groups, it is necessary to react at least two of the amine hydrogens in order to form a product which will crosslink with a trifunctional alcohol. The adduct of the amino compound and the formaldehyde is ordinarily sold as an ether in most cases that of butanol. Etherification prevents the reaction product of the amino compound and formaldehyde from crosslinking and solidifying through continued reaction of the hydroxyl group on one of the reaction products with an unreacted amine hydrogen on another molecule of the amine compound. The etherification also modifies water and organic phase solubility, lessens self-condensation during cure, and gives a product which is less hygroscopic.

The particular advantage to using melamine based materials as the amino component is that both of the hydrogens on any amino group are available for reaction with formaldehyde, whereas when using urea it is difficult to react the second hydrogen following addition of the first mole of formaldehyde to the amino group.

Set out below are various tradenames of methylolamino compounds used in the present invention. These alcohols have been conveniently etherified with a material such as butanol or methanol or other monohydric alcohol to provide storage stability. A particularly useful material in the present invention is Cymel 303 a fully methylated melamine formaldehyde resin obtained from the American Cyanamid Company. Other useful resins also available from American Cyanamid include the melamine formaldehydes sold as Cymel 300, 301, 350, 370, 373, 380, 1116, 1156 and 1130. The benzoguamines are sold as Cymel 1123, 1125 and 1134.

The urea-formaldehyde resins included herein are available from American Cyanamid and include Beetle 60, 65, 80 and XB-1050. Partially alkylated melamine resins include Cymel 325, 370, 380, 243, 245, 248 and 255. The foregoing resins are described in a publication of American Cyanamid entitled Amino Cross-Linking Agents.

Additional methylolamino compounds include the guanamides and benzoguanamines; substituted thioameline; triaminopyrimidine; 2-mercapto-4,6-diaminopyrimidine; 3,5-diaminotriazole; carbamylguanazole; 2,4-diaminothiodiazole; 2-oxo-4,5-diaminoparabanic acid and mixtures thereof.

The methylolamino component of the composition is generally present in amounts, by weight, up to about 90%. The polyol component may be present in amounts, by weight, up to 80%. Various modifiers may be included in the composition such as pigments, flow control agents, dispersants, etc., in minor amounts.

Coatings are prepared conveniently by using the methanol or butanol adduct of the methylolamino compound which is mixed with the polyol. The coating is applied by brushing, knife edge, spray or other conventional means followed by baking. Acid catalysts are employed at low levels to effect the cure.

The composition of the present invention as previously noted is highly useful in forming coatings, particularly coatings for laundry appliances, refrigerators, and generally for any metal requiring a protective coating. In particular, the composition of the present invention is highly useful in the area of high solids coatings requiring little or no volatile solvent in the product. It, for instance, has been extremely difficult to formulate coatings such as are described herein wherein high molecular weight alcohols are employed. That is, high molecular weight alcohols are ordinarily solid materials. However, using the components described herein, liquid coating compositions which exceed 70% solids and in some cases up to 100% solids can be obtained using conventional coating equipment such as high speed electrostatic disk applicators, conventional spray equipment, and hand application such as brushing.

A further advantage of the composition of the invention is that it can be cured at temperatures substantially below the temperatures required to cure conventional high solids melamine resin systems.

To further illustrate the invention, the following Examples are provided; it being understood that their purpose is entirely illustrative and in no way intended to limit the scope of the invention.

In the Examples, the following ASTM testing procedures for coatings were used:
1. Pencil Hardness—ASTM D 3363-74
2. Adhesion Cross Hatch 20lb. Tape—ASTM D 3359-76
3. Flexibility Direct and Reverse Impact—ASTM D 2794-74
4. Cleveland Condensing Humidity Test—ASTM D 2247-68.

EXAMPLE 1

A composition was prepared by mixing the following ingredients (listed in parts by weight) at room temperature:

| | |
|---|---|
| Bis(hydroxymethyl) tricyclo[5,2,1,0$^{2,6}$]decane (hydroxyl equivalent wt. = 98.14) | 98.14 |
| Cymel 303 | 160.00 |
| Catalyst 4040 | 2.58 |
| Ethylene glycol monoethyl ether acetate | 105.62 |

Cymel 303 is a fully methylated melamine formaldehyde resin having an average equivalent wt. = 160. Catalyst 4040 is a p-toluenesulfonic acid, a strong acid catalyst. Both products are manufactured by American Cyanamid.

The composition had a solids content of 70.46%, by weight. The composition was applied by conventional air spray onto Bonderite 1000 cold rolled steel plate and cured at 150° C. for twenty minutes to a pencil hardness of 2H.

Film flexibility was measured by direct and reverse impact. The coating withstood 2 inch lbs. on direct and 0.5 inch lbs. on reverse impact.

Resistance to moisture was measured by the Cleveland condensing humidity test. After 600 hours of exposure, no substrate rusting, no film softening, and no film blistering was observed.

EXAMPLE 2

A composition was prepared by mixing the following ingredients at room temperature:

| | |
|---|---|
| Caprolactone adduct of bis(hydroxymethyl) tricyclo[5,2,1,0$^{2,6}$]decane | 70.00 |
| Cymel 303 | 30.00 |
| Catalyst 4040 | 1.00 |
| Ethylene glycol monoethyl ether acetate | 28.57 |

The caprolactone adduct of bis(hydroxymethyl)-tricyclo[5,2,1,0$^{2,6}$]decane had an average of 0.9 equivalents of caprolactone per equivalent of hydroxyl and a hydroxyl equivalent weight of 196.

The composition had a solids content of 77.78%, by weight. The composition was applied by conventional air spray onto Bonderite 1000 steel plate and cured at 150° C. for twenty minutes to a pencil hardness of H.

Film flexibility was measured by direct and reverse impact. The coating withstood 60 inch lbs. on direct and 40 inch lbs. on reverse impact.

EXAMPLE 3

Several compositions were prepared using polyols which were ethylene oxide adducts of bis(hydroxymethyl)tricyclo[5,2,1,0$^{2,6}$]decane as follows:

| | |
|---|---|
| Composition 3A | |
| Ethylene oxide adduct polyol (1.0 mole ethylene oxide per hydroxyl equivalent of bis(hydroxymethyl) tricyclo decane; hydroxyl equivalent wt. = 143) | 143.00 |
| Cymel 303 | 160.00 |
| Catalyst 4040 | 3.03 |
| Composition 3B | |
| Ethylene oxide adduct polyol (2.0 moles ethylene oxide per hydroxyl equivalent of bis(hydroxymethyl) tricyclo decane; hydroxyl equivalent wt. = 186) | 186.00 |
| Cymel 303 | 160.00 |
| Catalyst 4040 | 3.50 |
| Composition 3C | |
| Ethylene oxide adduct polyol (2.7 moles ethylene oxide per hydroxyl equivalent of bis(hydroxymethyl) tricyclodecane; hydroxyl equivalent wt. = 215.3) | 215.30 |
| Cymel 303 | 160.00 |
| Catalyst 4040 | 3.75 |
| Composition 3D | |
| Ethylene oxide adduct polyol (3.6 moles ethylene oxide per hydroxyl equivalent of bis(hydroxylmethyl) tricyclodecane; hydroxyl equivalent wt. = 255.4) | 255.40 |
| Cymel 303 | 160.00 |
| Catalyst 4040 | 4.00 |
| Composition 3E | |
| Ethylene oxide adduct polyol (3.6 moles ethylene oxide per hydroxyl equivalent of bis(hydroxymethyl) tricyclodecane; hydroxyl equivalent wt. = 255.4) | 255.4 |
| Cymel 303 | 228.0 |

-continued

| | |
|---|---|
| Catalyst 4040 | 4.83 |

The compositions were prepared and applied by conventional air spray onto Bonderite 1000 steel plate and tested as in the previous Examples. The results are tabulated below:

| Composition | 3A | 3B | 3C | 3D | 3E |
|---|---|---|---|---|---|
| Ratio of Polyol: Melamine | 47/53 | 54/46 | 57/43 | 61/38 | 53/47 |
| % Solids by weight | 99 | 99 | 99 | 99 | — |
| Cure Temperature (°C.) | 150 | 150 | 150 | 150 | 150 |
| Cure Time (min.) | 20 | 20 | 20 | 20 | 20 |
| Pencil Hardness | 2H | 2H | H | 2H | 2H |
| Impact (inch lb.) | | | | | |
| Forward | 20 | 30 | — | 50 | — |
| Reverse | 1 | 2 | 2 | 20 | 6 |
| Cleveland condensing humidity | 600 hrs - no rust, blisters or softening | *A | *B | *C | 36 hrs - no rust |

*A =
600 hrs - no rust, blistering or softening
1224 hrs - isolated rust, no blistering or softening
*B =
24 hrs - localized rust
48 hrs - rust, no softening
72 hrs - some softening indicating water pick-up
219 hrs - blistering
*C 24 hrs - rusted From the foregoing detailed description and Examples, it should be apparent that the invention encompasses a wide range of compounds. It should also be apparent that while the invention has been described in terms of various preferred embodiments, and exemplified with respect thereto, those of skill in the art will readily appreciate that various modifications, changes, omissions, and substitutions may be made without departing from the spirit of the invention. It is therefore intended that the present invention be limited solely by the scope of the following claims.

I claim:

1. A composition of matter which is the product of at least one methylolamino compound and at least one bishydroxymethyl tricyclo compound which is a member selected from the group consisting of compounds of the formula:

and

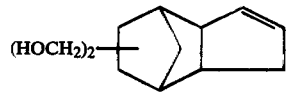

and mixtures thereof.

2. The composition of claim 1, wherein the methylolamino compound is the reaction product of formaldehyde, a member selected from the group consisting of:
    (a) melamine;
    (b) urea;
    (c) thiourea;
    (d) guanamines and benzoguanamines;
    (e) substituted thioameline;
    (f) triaminopyrimidine;
    (g) 2-mercapto-4,6-diaminopyrimidine;
    (h) 3,5-diaminotriazole;
    (i) carbamylguanazole;
    (j) 2,4-diaminothiodiazole;
    (k) 2-oxo-4,5-diaminoparabanic acid; and
    (l) glycoluril,
and mixtures thereof.

3. The composition of claim 2, wherein the methylolamino compound is etherified or partially etherified.

4. The composition of claim 2, wherein the polyol compound is a member selected from the group consisting of 8(9),3(4)bis(hydroxymethyl)-tricyclo[5,2,1,0$^{2,6}$]-decane, 8,8(9,9)bis(hydroxylmethyl)-tricyclo[5,2,1,0$^{2,6}$]-decane, 8,8(9,9)bis(hydroxymethyl)-tricyclo[5,2,1,0$^{2,6}$]-dec-3-ene and mixtures thereof.

5. The composition of claim 4, wherein the polyol compound is modified with a member selected from the group consisting of ethylene oxide, propylene oxide, styrene oxide, adipic acid, the phthalic acids and anhydrides thereof, and caprolactone and mixtures thereof.

6. The composition of claim 1, wherein said polyol compound is present in an amount ranging from about 10% to about 80%, by weight, and said methylolamino compound is present in an amount ranging from about 20% to about 90%, by weight.

7. The cured product of claim 1.

* * * * *